(12) United States Patent
Okura et al.

(10) Patent No.: US 12,290,796 B2
(45) Date of Patent: May 6, 2025

(54) POROUS CELLULOSE MEDIUM

(71) Applicant: Daicel Corporation, Osaka (JP)

(72) Inventors: Hiromichi Okura, Tokyo (JP); Toru Shibata, Tokyo (JP); Yuki Hirabayashi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 673 days.

(21) Appl. No.: 17/619,250

(22) PCT Filed: Jun. 19, 2020

(86) PCT No.: PCT/JP2020/024057
§ 371 (c)(1),
(2) Date: Dec. 15, 2021

(87) PCT Pub. No.: WO2020/256088
PCT Pub. Date: Dec. 24, 2020

(65) Prior Publication Data
US 2022/0258129 A1    Aug. 18, 2022

(30) Foreign Application Priority Data
Jun. 20, 2019 (JP) ................. 2019-114910

(51) Int. Cl.
| | |
|---|---|
| *B01J 20/28* | (2006.01) |
| *B01D 15/34* | (2006.01) |
| *B01J 2/06* | (2006.01) |
| *B01J 20/24* | (2006.01) |
| *B01J 20/285* | (2006.01) |
| *B01J 20/30* | (2006.01) |

(52) U.S. Cl.
CPC ............ *B01J 20/285* (2013.01); *B01D 15/34* (2013.01); *B01J 2/06* (2013.01); *B01J 20/24* (2013.01); *B01J 20/28004* (2013.01); *B01J 20/28016* (2013.01); *B01J 20/28085* (2013.01); *B01J 20/3064* (2013.01)

(58) Field of Classification Search
CPC ... B01J 20/28; B01J 20/285; B01J 2/06; B01J 20/24; B01J 20/28004; B01J 20/28016; B01J 20/28085; B01J 20/3064; B01D 15/34

USPC ......................................... 502/404
See application file for complete search history.

(56) References Cited

U.S. PATENT DOCUMENTS

| | | | |
|---|---|---|---|
| 5,972,507 A | 10/1999 | Morimoto et al. | |
| 2016/0200835 A1 | 7/2016 | Kurabayashi et al. | |
| 2018/0056271 A1 | 3/2018 | Kawai et al. | |

FOREIGN PATENT DOCUMENTS

| | | | | |
|---|---|---|---|---|
| EP | 0 460 609 A1 | 12/1991 | | |
| JP | 48-43082 A | 6/1973 | | |
| JP | 4-41533 A | 2/1992 | | |
| JP | 10-182842 A | 7/1998 | | |
| JP | 2011-231152 A | 11/2011 | | |
| JP | 2013-133355 A | 7/2013 | | |
| WO | 2015/029790 A1 | 3/2015 | | |
| WO | WO-2015046473 A1 * | 4/2015 | ......... | B01D 15/3809 |
| WO | 2016/162143 A1 | 10/2016 | | |
| WO | 2016/167268 A1 | 10/2016 | | |

OTHER PUBLICATIONS

Search Report issued for counterpart European Patent Appln. No. 20825674.3 (Issue date: Jul. 5, 2023).
International Search Report and Written Opinion mailed on Sep. 15, 2020, received for PCT Application PCT/JP2020/024057, Filed on Jun. 19, 2020, 12 pages including English Translation.

\* cited by examiner

*Primary Examiner* — Edward M Johnson
(74) *Attorney, Agent, or Firm* — XSENSUS LLP

(57) ABSTRACT

Provided is a novel porous cellulose medium that can efficiently separate a large target molecule in a calibration standard. A porous cellulose medium including a porous cellulose particle having a particle size from 1 to 600 μm, wherein, in sieving the porous cellulose medium for classification and using a fraction corresponding to aperture openings between 53 μm and 106 μm as a support for size exclusion chromatography, a polyethylene oxide standard is run through size exclusion chromatography with pure water as a mobile phase, and a weight average molecular weight Mw and a gel partition coefficient $K_{av}$ of the polyethylene oxide standard satisfy Relationships (A) and (B) above:

in a case where $4.80 \leq \log Mw \leq 5.50, K_{av} > -0.445 \times \log Mw + 2.55$     (A)

in a case where $5.75 \leq \log Mw, 0 \leq K_{av} < 0.19$     (B).

3 Claims, 6 Drawing Sheets

POROUS CELLULOSE MEDIUM

CROSS-REFERENCE TO RELATED APPLICATIONS

The present application is based on PCT filing PCT/JP2020/024057, filed Jun. 19, 2020, which claims priority to Japanese Patent Applications No. 2019-114910, filed on Jun. 20, 2019, the entire contents of each are incorporated herein by reference.

TECHNICAL FIELD

The present disclosure relates to a porous cellulose medium and a method for producing the same.

BACKGROUND ART

Polysaccharides represented by cellulose, and derivatives thereof are used in a variety of applications. For example, the porous cellulose medium can itself serve as an adsorbent, and when a surface of the porous cellulose medium is subjected to some sort of chemical modification, functions such as adsorption, separation, catalytic functions, etc. can be imparted.

For example, Patent Document 1 describes a method for producing porous cellulose beads, the method including a) mixing a low temperature alkaline aqueous solution and cellulose to produce a cellulose fine dispersion; b) adding a crosslinking agent to the cellulose fine dispersion to produce a mixed liquid; c) dispersing the mixed liquid in a dispersion medium to produce an emulsion; and d) contacting the emulsion with a coagulation solvent. According to the method described in Patent Document 1, cellulose beads having excellent adsorption ability with pore shapes and pore diameter distributions suitable for an adsorbent can be produced.

Furthermore, Patent Document 2 describes a method for dissolving cellulose in a mixed aqueous solution from 5 to 12 weight % of sodium hydroxide and from 9 to 20 weight % of urea or from 3 to 8 weight % of thiourea, in which the cellulose is used as crystalline cellulose and the mixed aqueous solution is pre-cooled to 10 to 15° C., or without pre-cooling, the cellulose is dissolved in the mixed aqueous solution at 10 to 15° C., and the dissolved crystalline cellulose is regenerated to produce porous cellulose. According to the method described in Patent Document 2, it is possible to dissolve crystalline cellulose with fewer steps or less costs than a known method and to produce porous cellulose by regenerating crystalline cellulose in such a solution.

CITATION LIST

Patent Documents

Patent Document 1: WO 2016/167268
Patent Document 2: JP 2011-231152 A

SUMMARY OF DISCLOSURE

Technical Problem

A porous cellulose medium can be used, for example, as a support or the like in chromatography. Here, if the size of a pore diameter of a support can be adjusted and a pore volume of the pore diameter can be increased according to the size of the target molecule to be separated by the support in chromatography, the efficiency of the separation of target molecule can be increased.

For example, when a porous cellulose medium is used as a support in chromatography and a large molecule such as a protein (for example, a polymer having a weight average molecular weight from approximately $10^{5.0}$ to $10^{5.5}$, which is used as a calibration standard for chromatography) is used as a target molecule, in order to efficiently separate the target molecule, it is required to increase the pore diameter of the porous cellulose medium and increase the pore volume of the pore diameter. However, in the known method for producing a porous cellulose medium, it is difficult to increase the pore volume for large pore diameters, and it is not possible to efficiently separate the target molecule in the calibration standard having a weight average molecular weight from approximately $10^{5.0}$ to $10^{5.5}$.

Under such circumstances, the main purpose of the present disclosure is to provide a novel porous cellulose medium that can efficiently separate a large target molecule in a calibration standard having a large pore diameter and a large pore volume and a weight average molecular weight from approximately $10^{5.0}$ to $10^{5.5}$.

Solution to Problem

The inventors of the present disclosure conducted diligent research to solve the problems described above. As a result, a novel method for producing a porous cellulose medium has been found, in which the method includes atomizing a cellulose solution by spraying into a space from a spray nozzle, so as to form a fine particle, and coagulating the fine particle in a coagulation phase, wherein, in atomizing the cellulose solution, the space where the cellulose solution is sprayed is controlled such that a gas to be supplied to the space is only a gas being supplied together with the cellulose solution from the spray nozzle, and with this method it is possible to efficiently separate a large target molecule in the calibration standard having a large pore diameter and a large pore volume and a weight average molecular weight from approximately $10^{5.0}$ to $10^{5.5}$. More specifically, it has been found that by employing such a production method, the following porous cellulose medium is preferably produced: the porous cellulose medium containing a porous cellulose particle having a particle size from 1 to 600 μm, wherein, in sieving the porous cellulose medium for classification and using a fraction corresponding to aperture openings between 53 μm and 106 μm as a support for size exclusion chromatography, a polyethylene oxide standard is run through size exclusion chromatography with pure water as a mobile phase, and a weight average molecular weight Mw and a gel partition coefficient $K_{av}$ of the polyethylene oxide standard satisfy the following Relationships (A) and (B):

in a case where $4.80 \leq \log Mw \leq 5.50, K_{av} > -0.445 \times \log Mw + 2.55$ (A)

in a case where $5.75 \leq \log Mw, 0 \leq K_{av} < 0.19$ (B).

The present disclosure was achieved through further examinations based on these findings.

First Aspect. A porous cellulose medium containing a porous cellulose particle having a particle size from 1 to 600 μm, wherein, in sieving the porous cellulose medium for classification and using a fraction corresponding to aperture openings between 53 μm and 106 μm as a support for size exclusion chromatography, a polyethylene oxide standard is run through size exclusion chromatography with pure water as a mobile phase, and a weight average molecular weight Mw and a gel partition coefficient $K_{av}$ of the polyethylene oxide standard satisfy Relationships (A) and (B) below:

in a case where 4.80≤log $Mw$≤5.50,$K_{av}$>−0.445×log $Mw$+2.55     (A)

in a case where 5.75≤log $Mw$,0≤$K_{av}$<0.19     (B).

Second Aspect. The porous cellulose medium according to the first aspect, wherein the weight average molecular weight Mw and the gel partition coefficient $K_{av}$ of the polyethylene oxide standard satisfy Relationship (C) below:

in a case where 4.80≤log $Mw$≤5.50,−0.445×log $Mw$+3>$K_{av}$>−0.445×log $Mw$+2.55     (C).

Third Aspect. A method for producing a porous cellulose medium, including atomizing a cellulose solution by spraying into a space from a spray nozzle, so as to form a fine particle, and coagulating the fine particle in a coagulation phase, wherein in atomizing the cellulose solution, the space where the cellulose solution is sprayed is controlled such that a gas to be supplied is only a gas being supplied together with the cellulose solution from the spray nozzle.

Fourth Aspect. The method for producing a porous cellulose medium according to Third Aspect, wherein the cellulose solution contains a solvent, the solvent being at least one selected from the group consisting of a copper ethylenediamine solution, N-methylmorpholine oxide (NMMO) monohydrate, a caustic alkali-urea aqueous solution, a calcium thiocyanate aqueous solution, a N,N'-dimethylacetamide solution of lithium chloride, a dimethylformamide solution of lithium chloride, a dimethylimidazolium solution of lithium chloride, and a dimethyl sulfoxide solution of lithium chloride.

Fifth Aspect. The method for producing a porous cellulose medium according to Third Aspect or Fourth Aspect, wherein the coagulation phase is formed of a component different from the solvent of the cellulose solution.

Sixth Aspect. The method for producing a porous cellulose medium according to any one of Third Aspect to Fifth Aspect, wherein the coagulation phase is formed of a liquid phase, a vapor phase thereof, or a combination of a gas phase of an inert gas and the liquid phase or the vapor phase, the liquid phase containing at least one selected from the group consisting of alcohol, ketone, ester, ether, water, inorganic acid, and an aqueous inorganic salt solution.

Advantageous Effects of Disclosure

According to the present disclosure, it is possible to provide a novel porous cellulose medium that can efficiently separate a large target molecule in a calibration standard having a large pore diameter and a large pore volume and a weight average molecular weight from approximately 105.0 to 105.5, and a method for producing the same.

DESCRIPTION OF EMBODIMENTS

1. Porous Cellulose Medium

Figure 1:
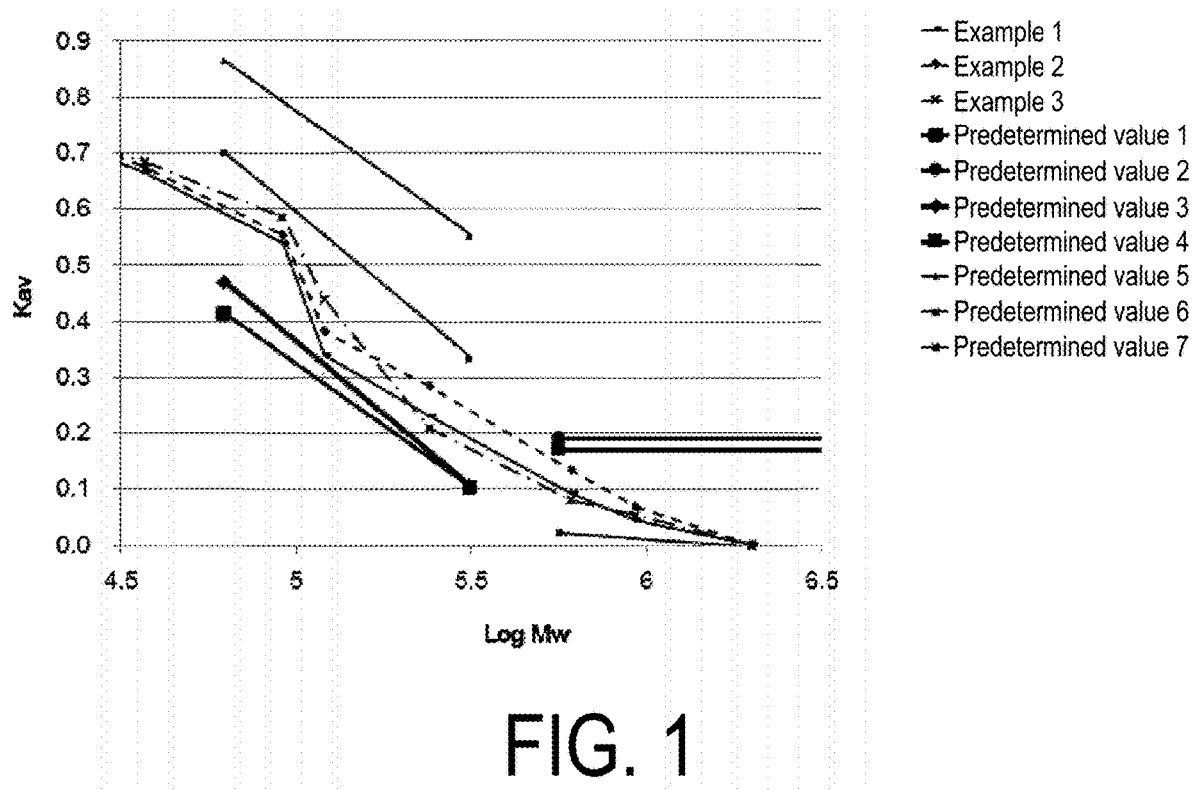
FIG. 1 is a graph showing a relationship between a logarithm of the weight average molecular weight (log Mw) and the gel partition coefficient $K_{av}$ of the polyethylene oxide standard with regard to the porous cellulose media of Examples 1 to 3 (each having a different cellulose). A straight line with a predetermined value of 1 to 7 is also illustrated.
Figure 2:
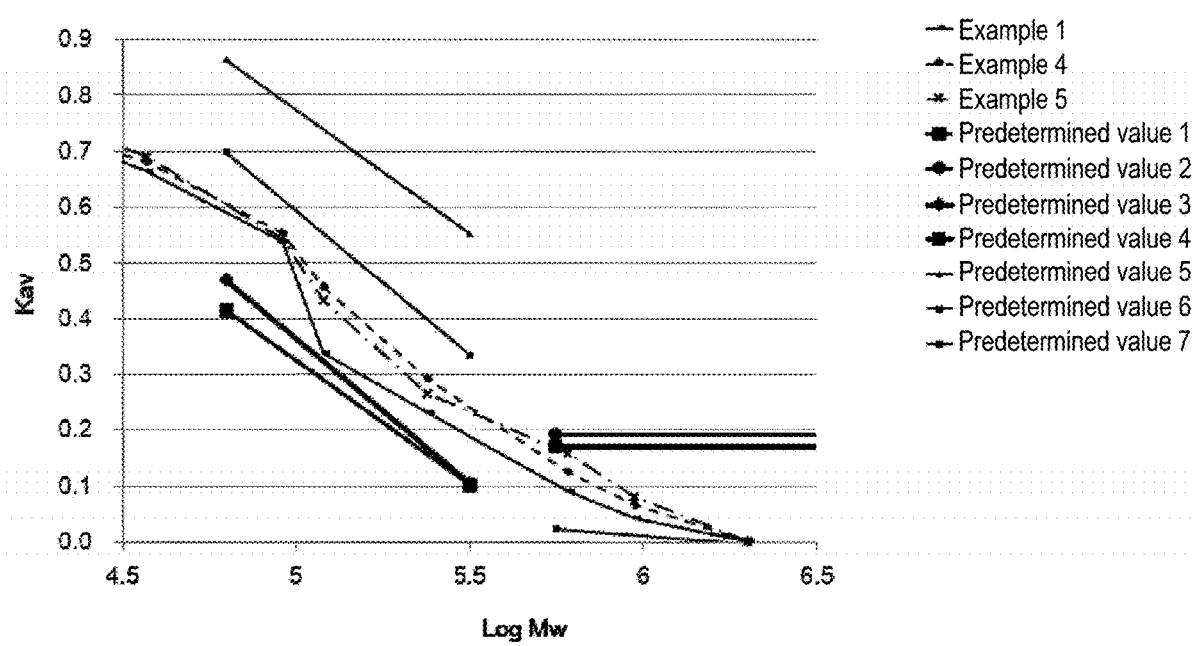
FIG. 2 is a graph showing a relationship between a logarithm of the weight average molecular weight (log Mw) and the gel partition coefficient $K_{av}$ of the polyethylene oxide standard with regard to the porous cellulose media of Examples 1, 4, and 5 (each having a different nozzle). A straight line with a predetermined value of 1 to 7 is also illustrated.
Figure 3:
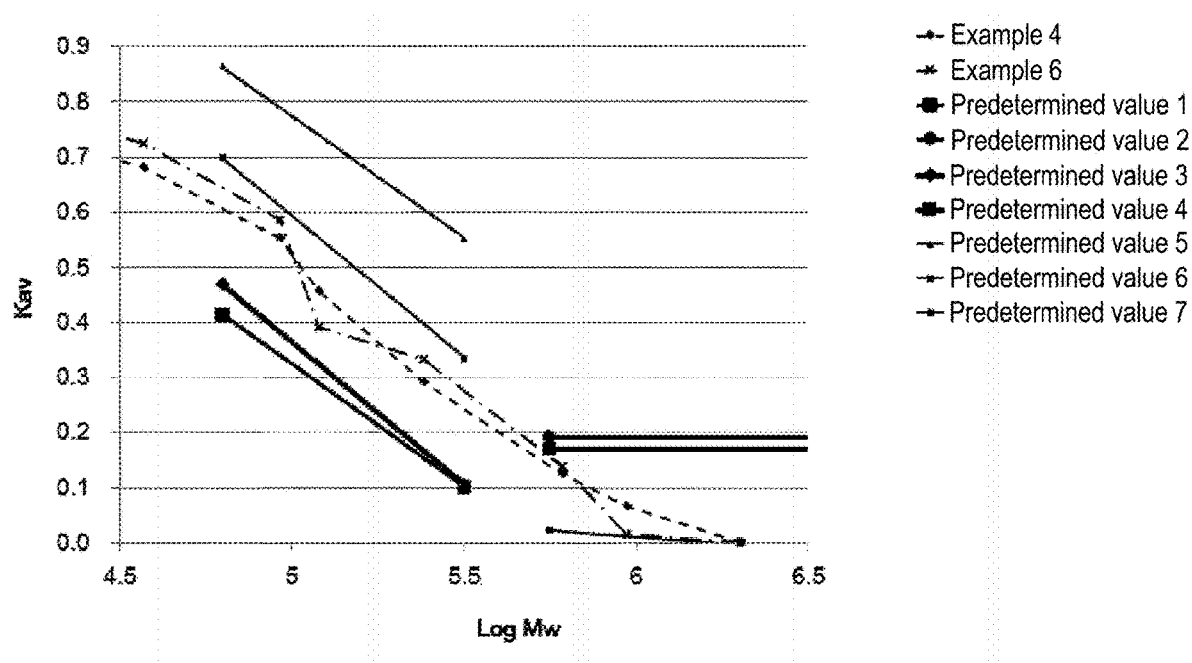
FIG. 3 is a graph showing a relationship between a logarithm of the weight average molecular weight (log Mw) and the gel partition coefficient $K_{av}$ of the polyethylene oxide standard with regard to the porous cellulose media of Examples 4 and 6 (each having a different coagulation bath composition). A straight line with a predetermined value of 1 to 7 is also illustrated.
Figure 4:
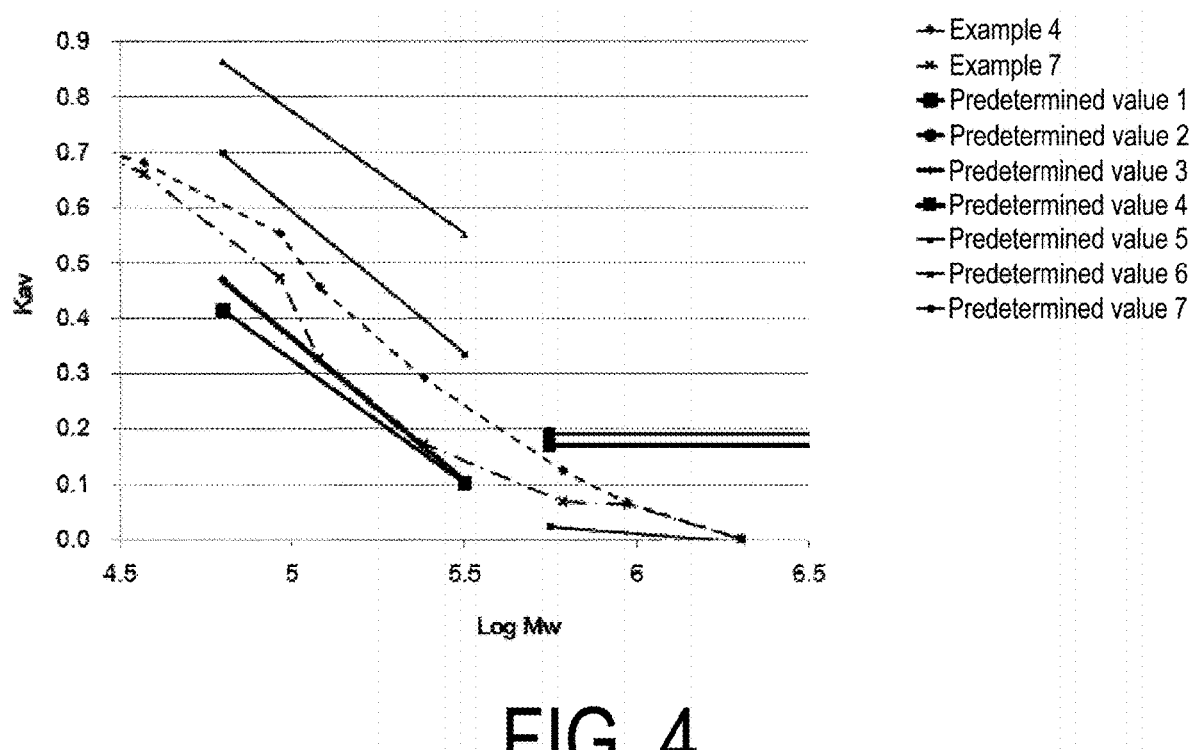
FIG. 4 is a graph showing a relationship between a logarithm of the weight average molecular weight (log Mw) and the gel partition coefficient $K_{av}$ of the polyethylene oxide standard with regard to the porous cellulose media of Examples 4 and 7 (each having a different cellulose solution). A straight line with a predetermined value of 1 to 7 is also illustrated.

The porous cellulose medium of the present disclosure contains porous cellulose particles having a particle size from 1 to 600 μm. Furthermore, the porous cellulose medium of the present disclosure is characterized in that in sieving the porous cellulose medium for classification and using a fraction corresponding to aperture openings between 53 μm and 106 μm as a support for size exclusion chromatography, a polyethylene oxide standard is run through size exclusion chromatography with pure water as a mobile phase, and a weight average molecular weight Mw and a gel partition coefficient $K_{av}$ of the polyethylene oxide standard satisfy Relationships (A) and (B) below:

in a case where 4.80≤log $Mw$≤5.50,$K_{av}$>−0.445×log $Mw$+2.55     Relationship (A):

in a case where 5.75≤log $Mw$,0≤$K_{av}$<0.19     Relationship (B):

Hereinafter, the porous cellulose medium of the present disclosure will be described in detail. As will be described later, regarding the Relationship (A), a straight line $K_{av}$=−0.445×log Mw+2.55 is, for example, the straight line indicated as a predetermined value 1 in FIGS. 1 to 6. In relation to the Relationship (B), a straight line $K_{av}$=0.19 is the straight line indicated as a predetermined value 2 in FIGS. 1 to 6, for example. The porous cellulose medium of the present disclosure that simultaneously satisfies Relationship (A) and Relationship (B) can efficiently separate a large target molecule in a calibration standard having a large pore diameter and a large pore volume and a weight average molecular weight from approximately $10^{5.0}$ to $10^{5.5}$. In addition, the porous cellulose medium that simultaneously satisfies Relationship (A) and Relationship (B) is a new one that is not known in the related art. As described below, the porous cellulose medium of the present disclosure with such characteristics can be preferably produced, for example, by employing the method described below in the section "2. Method for producing porous cellulose".

The porous cellulose medium of the present disclosure contains porous cellulose particles having a particle size from 1 to 600 μm. Specifically, the porous cellulose medium of the present disclosure is an aggregate of particulate porous cellulose, and contains porous cellulose particles having a particle size from 1 to 600 μm. The porous cellulose medium of the present disclosure is not particularly limited as long as it contains porous cellulose particles having a particle size within the above range, and can measure Relationships (A) and (B) described later (that is, it contains a fraction corresponding to aperture openings between 53 μm and 106 μm). From the viewpoint of more efficiently separating the target molecule in the calibration standard having a weight average molecular weight from approximately $10^{5.0}$ to $10^5$ the porous cellulose medium contains porous cellulose particles having a particle size from preferably approximately 5 to 400 μm, and more preferably approximately 10 to 250 μm. Note that, the particle size of the porous cellulose particle is a value set by using a sieve. For example, when the porous cellulose medium is passed through a sieve with an aperture opening of 250 μm and washed repeatedly on a sieve with aperture opening of 10 μm, porous cellulose particles having a particle size in the range from 10 to 250 μm can be extracted from the porous cellulose medium.

The porous cellulose medium of the present disclosure may contain porous cellulose particles having a particle size of smaller than 1 μm or porous cellulose particles having a particle size greater than 600 μm. The lower limit of the particle size of the porous cellulose medium of the present disclosure is, for example, 1 μm or greater and 5 μm or greater, and examples of the upper limit include, for example, 600 μm or smaller, 500 μm or smaller, 400 μm or smaller, 300 μm or smaller, and the like. The proportion of the porous cellulose particles having a particle size from 10 to 250 μm in the porous cellulose medium of the present disclosure is preferably 80 mass % or greater, more preferably 90 mass % or greater, even more preferably 95 mass % or greater, and particularly preferably 98 mass % or greater, and also, it may be 100 mass %.

According to the porous cellulose medium of the present disclosure, in sieving the porous cellulose medium for classification and using a fraction corresponding to aperture openings between 53 μm and 106 μm as a support for size exclusion chromatography, a polyethylene oxide standard is run through size exclusion chromatography with pure water as a mobile phase, and a weight average molecular weight Mw and a gel partition coefficient $K_{av}$ of the polyethylene oxide standard satisfy Relationships (A) and (B) below. The method for measuring the gel partition coefficient $K_{av}$ and calculating the Relationship with log Mw is as follows.

in a case where 4.80≤log $Mw$≤5.50,$K_{av}$>−0.445×log $Mw$+2.55      Relationship (A):

in a case where 5.75≤log $Mw$,0≤$K_{av}$<0.19      Relationship (B):

<Measuring Gel Partition Coefficient $K_{av}$ and Calculating Relationship with Log Mw>

The porous cellulose medium is sieved for classification. Using a fraction corresponding to aperture openings between 53 μm and 106 μm as a support for size exclusion chromatography, a polyethylene oxide standard is run through size exclusion chromatography with pure water as a mobile phase, and thus the gel partition coefficient $K_{av}$ is obtained. Specifically, the classified porous cellulose medium is packed in a column (for example, "Tricorn 10/100" available from GE Healthcare Japan) so that the bed height is 8 cm or greater. The column is connected to high speed liquid chromatography system to perform size exclusion chromatography measurements. The marker is used by dissolving polyethylene oxide (for example, TSKgel polyethylene oxide standards SE kit available from TOSOH) and dextran (for example, Blue Dextran (Blue Dextran 2000, available from GE Healthcare)) is dissolved in ultrapure water and used. While degassed ultrapure water is flowing through the column at a flow rate of 0.1 mL/min, first, in order to determine the volume other than a bead portion in the column, a solution of dextran (Blue dextran (Blue Dextran 2000 available from GE Healthcare)) having a weight average molecular weight of 2×$10^6$ is injected, and a liquid flow rate until the peak is observed after the injection on a RI monitor. Next, the liquid flow rate is obtained similarly for each marker solution. The measured value is substituted into the following equation to calculate the value of $K_{av}$.

$$K_{av}=(V_R-V_0)/(V_t-V_0)$$

[where $V_R$ represents the amount of liquid flow rate (mL) until the peak is observed after injecting each of the marker solutions, $V_0$ represents the liquid flow rate (mL) until the peak is observed after injecting the dextran solution having a weight average molecular weight of 2×$10^6$, and $V_t$ represents a volume (mL) of beads in the column.]

In the porous cellulose medium of the present disclosure, from the viewpoint of more efficiently separating a target molecule in a calibration standard having a large weight average molecular weight from approximately $10^{5.0}$ to $10^{5.5}$, it is preferable that the weight average molecular weight Mw and the gel partition coefficient $K_{av}$ of the polyethylene oxide standard further satisfy Relationship (C) below in addition to Relationships (A) and (B) described above.

in a case where 4.80≤log $Mw$≤5.50,−0.445×log $Mw$+3>$K_{av}$>−0.445×log $Mw$+2.55.      Relationship (C):

Here, for the Relationship (C), a straight line $K_{av}$=−0.445×log Mw+3 is the straight line indicated as the predetermined value 5 in FIGS. 1 to 4, for example. In other words, in the range from 4.80≤log Mw≤5.50, the Relationship (C) is within a range of the straight line with a predetermined value of 1 and the straight line with a predetermined value of 5 in the graph of FIGS. 1 to 4.

In addition, in the porous cellulose medium of the present disclosure, from the viewpoint of more efficiently separating a target molecule in the calibration standard having a large weight average molecular weight from approximately $10^{5.0}$ to $10^{5.5}$, the weight average molecular weight Mw and the gel partition coefficient $K_{av}$ of the polyethylene oxide standard more preferably satisfy Relationship (D) below, and still more preferably satisfy Relationship (E) below:

in a case where 4.80≤log $Mw$≤5.50,−0.521×log $Mw$+3.2>$K_{av}$>−0.445×log $Mw$+2.55      Relationship (D):

in a case where 4.80≤log $Mw$≤5.50,−0.521×log $Mw$+3.2>$K_{av}$>−0.521×log $Mw$+2.97      Relationship (E):

Here, for Relationship (D), a straight line $K_{av}$=−0.445×log Mw+2.55 is the straight line indicated as the predetermined value 1 in FIGS. 1 to 6, for example. In addition, for Relationship (D), a straight line $K_{av}$=−0.521×log Mw+3.2 is the straight line indicated as the predetermined value 7 in FIGS. 1 to 6, for example. In other words, in the range from 4.80≤log Mw≤5.50, Relationship (D) indicates a range between the straight line with a predetermined value of 1 in FIGS. 1 to 6 and the straight line with a predetermined value of 7.

Here, for Relationship (E), a straight line $K_{av}=-0.521\times\log Mw+2.97$ is the straight line indicated as the predetermined value 3 in FIGS. 1 to 6, for example. In addition, for Relationship (D), a straight line $K_{av}=-0.521\times\log Mw+3.2$ is the straight line indicated as the predetermined value 7 in FIGS. 1 to 6, for example. In other words, in the range of 4.80≤log Mw≤5.50, Relationship (E) indicates a range between the straight line with a predetermined value of 3 and the straight line with a predetermined value of 7 in FIGS. 1 to 6.

In addition, in the porous cellulose medium of the present disclosure, from the viewpoint of more efficiently separating a target molecule in the calibration standards having a large weight average molecular weight from approximately $10^{5.0}$ to $10^{5.5}$, the weight average molecular weight Mw and the gel partition coefficient $K_{av}$ of the polyethylene oxide standards preferably satisfy Relationship (F) below, and more preferably have Relationship (G) below.

in a case where 5.75≤log $Mw$, 0≤$K_{av}$<0.17     Relationship (F):

in a case where 5.75≤log $Mw$, −0.0482×log $Mw$+0.3≤$K_{av}$<0.17     Relationship (G):

In relation to Relationship (F), a straight line $K_{av}=0.17$ is the straight line indicated as a predetermined value 4 in FIGS. 1 to 6, for example. In relation to Relationship (G), a straight line $K_{av}=K_{av}=-0.0482\times\log Mw+0.3$ is the straight line indicated as a predetermined value 6 in FIGS. 1 to 6, for example. In other words, in the range of 5.75≤log Mw, Relationship (G) indicates a range between the straight line with a predetermined value of 4 and the straight line with a predetermined value of 6 in FIGS. 1 to 4.

The porous cellulose medium of the present disclosure is formed of cellulose and may include a known component contained in a known porous cellulose medium with the limit not to inhibit the effects of the present disclosure. For example, a porous cellulose medium containing unsubstituted cellulose and a polymer having a glucose unit other than unsubstituted cellulose can be used, and carboxymethylcellulose, cellulose phosphate, and the like can be suitably used as the polymer. Such porous cellulose medium can be imparted with a functionality that is not the porous cellulose itself formed of unsubstituted cellulose (functionality of the polymer described above). The porous cellulose medium of the present disclosure can be usually stored in a wet state. When the cellulose beads are to be dried, an appropriate amount of saccharides, glycerin, or the like is added. In the case of long-term storage in a wet state, a preservative such as an alcohol or sodium azide is added to prevent spoilage. In addition, the cellulose beads to which glycerin, a saccharide, urea, or the like has been added can be dried.

Further, the porous cellulose medium of the present disclosure can also be particularly suitably used in size exclusion chromatography. Furthermore, this again indicates that the porous cellulose medium of the present disclosure can be used for chromatographic separation in various modes besides size exclusion by bonding an appropriate ligand to the porous cellulose medium or by substituting and modifying a functional group on its surface to another functional group. These other modes include modes such as ion exchange chromatography, hydrophobic interaction chromatography, and affinity chromatography.

In addition, the porous cellulose medium of the present disclosure can be used as a separating agent having improved strength by crosslinking between cellulose chains by covalent bonding using a crosslinking agent.

An adsorbent can also be produced by immobilizing an affinity ligand on the porous cellulose medium of the present disclosure or a crosslinked porous cellulose medium. The adsorbent can also be used as a separating agent for affinity chromatography.

In the present disclosure, the method for producing a porous cellulose medium is not particularly limited as long as a porous cellulose medium satisfying Relationships (A) and (B) with the aforementioned particle sizes is obtained, and the porous cellulose medium can be suitably produced by the production method described in the following section "2. Method for producing porous cellulose medium".

2. Method for Producing Porous Cellulose Medium

The method for producing a porous cellulose medium includes atomizing a cellulose solution by spraying into a space from a spray nozzle, so as to form fine particles, and coagulating the fine particles in a coagulation phase, wherein in atomizing the cellulose solution, the space where the cellulose solution is sprayed is controlled such that a gas to be supplied is only a gas being supplied together with the cellulose solution from the spray nozzle. By employing such a production method, the porous cellulose medium of the present disclosure, which satisfies the above particle sizes and Relationships (A) and (B), can be suitably produced.

(Forming Fine Particles)

In forming fine particles, the cellulose solution is sprayed into the space from the spray nozzle to form fine particles. Furthermore, in atomizing the cellulose solution, the space in which the cellulose solution is sprayed is controlled such that a gas to be supplied is only a gas being supplied from the spray nozzle together with the cellulose solution.

The cellulose solution is not particularly limited as long as the cellulose solution is a liquid containing cellulose and is coagulated in the coagulation phase described below. Examples include cellulose solutions obtained by dissolving cellulose in the solvents. Examples of the solvents include a copper ethylenediamine solution, N-methylmorpholine oxide (NMMO) monohydrate, a caustic alkali-urea aqueous solution, a calcium thiocyanate aqueous solution, a N,N'-dimethylacetamide solution of lithium chloride, a dimethylformamide solution of lithium chloride, a dimethylimidazolium solution of lithium chloride, and a dimethyl sulfoxide solution of lithium chloride. These solvents may be used alone or in combination of two or more thereof. Among these, the solvent is preferably a caustic alkali-urea aqueous solution (for example, urea-alkali hydroxide aqueous solution, including urea, thiourea, and the like).

Note that, the cellulose solution means a liquid containing cellulose, which exhibits fluidity and solidifies cellulose when coming into contact with a coagulation phase, and it does not matter whether cellulose molecules are dispersed in the cellulose solution, some associated products are left, or fine fibrous materials are merely dispersed (sometimes referred to as a dispersion liquid). That is, in the method for producing a porous cellulose medium according to the present disclosure, the cellulose solution means a liquid containing cellulose, and the term includes a dispersion in which cellulose is dispersed in a liquid, and a solution in which cellulose is dissolved in a liquid. In the method for producing a porous cellulose medium according to the present disclosure, cellulose needs only be included in the cellulose solution, and in terms of the form, it may be dispersed or dissolved, or in a mixed state of the dispersed and dissolved.

The method for preparing the cellulose solution will be described in detail below using an example case in which a urea-alkali hydroxide aqueous solution is used as the solvent.

The alkali contained in the alkali hydroxide aqueous solution is preferably lithium hydroxide, sodium hydroxide, potassium hydroxide, or quaternary ammonium hydroxide, and sodium hydroxide is most preferable from the perspectives of product safety, price, and good dissolution or dispersibility.

The alkali concentration of the alkaline aqueous solution is not particularly limited, but is preferably from 3 to 20 mass %. If the concentration of the alkali is within this range, the dispersibility, swelling property, and solubility of the cellulose in the alkaline aqueous solution are high, and thus such a concentration is preferable. The concentration of alkali is more preferably from 5 to 15 mass %, even more preferably from 7 to 10 mass %, and most preferably from 6 to 10 mass %.

Urea or thiourea is further added to the alkaline aqueous solution. The concentration of urea or thiourea is preferably from 10 to 15 mass %. Three components (cellulose, alkali hydroxide, and urea or thiourea) are added to the water, and the order of addition is appropriately selected to optimize the dissolution state of the cellulose. By cooling the slurry thus obtained under the conditions described later, a more transparent cellulose solution is obtained than immediately after addition of all the components.

In the atomizing step, the cellulose may be of any type as long as it becomes fine particles when sprayed from a spray nozzle as a cellulose solution and solidifies when brought into contact with a coagulation phase; however, from the viewpoints such as excelling in solubility, and ease of handling with low viscosity of the solution, so-called microcrystalline cellulose that has been subjected to mild acid hydrolysis, cellulose that has been regenerated through deacetylation from cellulose acetate, and cellulose such as rayon fibers are preferable.

The molecular weight of the cellulose is not particularly limited, but the degree of polymerization is preferably not greater than 1000. If the degree of polymerization is less than or equal to 1000, dispersibility and swelling properties in an alkaline aqueous solution are high, and thus such a degree of polymerization is preferable. If the degree of polymerization is greater than or equal to 10, the mechanical strength of the obtained cellulose beads is increased, and thus such a degree of polymerization is preferable. The range of the degree of polymerization is more preferably from 50 to 500, even more preferably from 100 to 400, and particularly preferably from 150 to 300.

Another example of cellulose with improved solubility is dissolved pulp.

The conditions for mixing the alkaline aqueous solution and the cellulose are not particularly limited as long as a cellulose solution is obtained. For example, cellulose may be added to an alkaline aqueous solution, or an alkaline aqueous solution may be added to the cellulose.

The cellulose may be suspended in water prior to mixing with the alkaline aqueous solution.

In addition, the concentration of cellulose in the cellulose solution is preferably from 1 to 10 mass %. When the content is 1 mass % or more, the mechanical strength of the obtained porous cellulose medium is increased, which is preferable. When the content is 10 mass % or less, the viscosity of the cellulose solution is low, and spraying from a spray nozzle is facilitated so that the cellulose solution has a predetermined particle size. The concentration of cellulose in the cellulose solution is more preferably from 2 to 6 mass %, and even more preferably from 3 to 5 mass %. Note that the cellulose concentration in the cellulose solution does not include the portion that does not become uniform and is not completely dissolved, dispersed, or swollen.

The temperature at which the cellulose solution is prepared is not particularly limited, but for example, a cellulose solution is suitably formed by mixing cellulose with an alkaline aqueous solution containing urea or thiourea at room temperature, cooling to a low temperature while stirring, and then returning the mixture to a manageable temperature. Examples of the temperature when cooling to a low temperature include from approximately 0° C. to −30° C., and preferably from approximately −5° C. to −15° C. The temperature of the cellulose solution sprayed from the spray nozzle is preferably approximately 0 to 50° C. and more preferably approximately 10 to 40° C. from the viewpoint of further suitably producing the porous cellulose of the present disclosure satisfying the above Relationships (A) and (B) and having a predetermined particle size. Furthermore, from the same viewpoint, the temperature of the space when the cellulose solution is sprayed into from the spray nozzle is preferably approximately 0 to 50° C., and more preferably approximately 10 to 40° C.

In the atomizing step, the space in which the cellulose solution is sprayed is controlled such that the gas to be supplied is only a gas being supplied from the spray nozzle together with the cellulose solution. For example, the space in which the cellulose solution is sprayed can be connected via the exhaust port, but the external gas is controlled not to be supplied there from the exhaust port, and the gas being supplied to the space from the spray nozzle together with the cellulose solution is guided to the outside via the exhaust port (that is, in the forming fine particles, the space in which the cellulose solution is sprayed is not on the negative pressure side with respect to the external space). That is, the space in which the cellulose solution is sprayed is blocked with an external gas, and the concentration of the vapor of the coagulation phase liquid is increased as compared to the open system.

The gas being supplied from the spray nozzle to the space together with the cellulose solution is preferably an inert gas, and examples thereof include nitrogen gas, argon, and the like. Additionally, the gas being supplied from the spray nozzle and the gas in the space are preferably identical.

From the viewpoint of further suitably producing the porous cellulose medium of the present disclosure satisfying the above Relationships (A) and (B) and having the predetermined particle size, the particle size of the cellulose solution sprayed from the spray nozzle is not particularly limited as long as the porous cellulose medium to be produced contains porous cellulose particles having a particle size from 1 to 600 μm, from 5 to 400 μm, and from 10 to 250 μm, and is preferably approximately from 10 to 200 μm.

The spray nozzle is not particularly limited as long as the spray nozzle can spray a liquid with a particle size from approximately 10 to 200 m, and a commercially available two-fluid nozzle, a three-fluid nozzle, or the like can be used.

The atomizing of the cellulose solution is preferably performed by spraying the sprayed cellulose solution so that the sprayed cellulose solution falls under gravity from above the coagulation phase in the coagulating the fine particles described below. Specifically, in a state in which the spray nozzle is installed on the coagulation phase, the cellulose solution is preferably sprayed into the space from the spray nozzle, and the coagulation phase is brought into contact with the coagulation phase by gravity free fall. From the viewpoint of further suitably producing the porous cellulose of the present disclosure satisfying Relationships (A) and (B) above and having the predetermined particle size, the height from the surface of the coagulation phase to the tip of the spray nozzle is preferably from 0.1 m to 20 m, and more preferably from 1 m to 20 m.

(Coagulating Fine Particles)

In the coagulating step, the fine particles of the cellulose solution formed in the atomizing step are coagulated in a coagulation phase.

When the fine particles of the cellulose solution are coagulated in the coagulation phase, as described above, the fine particles of the cellulose solution are brought into contact with the coagulation phase.

A known coagulation phase that coagulates the cellulose solution can be used, and is formed of, for example, a liquid phase, a vapor phase thereof, or a combination of a gas phase of an inert gas and the liquid phase or the vapor phase, the liquid phase containing at least one selected from the group consisting of alcohol, ketone, ester, ether, water, inorganic acid, and an aqueous inorganic salt solution. The component constituting the coagulation phase may be one, or two or more. The coagulation phase is preferably formed of a component different from the solvent of the cellulose solution.

Among these, a coagulation phase of water and alcohol is preferable, and a liquid phase of alcohol is particularly preferably used. It is also preferable to use a mixed solvent of water and alcohol (an alcohol aqueous solution).

The alcohol is not particularly limited, but an alcohol having 6 or fewer carbons is preferable, an alcohol having 4 or fewer carbons is more preferable, and methanol is most preferable.

The temperature of the coagulation phase is preferably approximately −30 to 50° C. and more preferably approximately −20 to 40° C. from the viewpoint of further suitably producing the porous cellulose of the present disclosure satisfying Relationships (A) and (B) below and having a predetermined particle size.

The obtained porous cellulose medium can be washed through a suitable method using water or an alcohol such as methanol or ethanol, and can usually be stored in a wet state. As described above, when the porous cellulose medium is to be dried, an appropriate amount of saccharides, glycerin, or the like is added. In the case of long-term storage in a wet state, a preservative such as an alcohol or sodium azide is added to prevent spoilage. In addition, the cellulose beads to which glycerin, a saccharide, urea, or the like has been added can be dried.

EXAMPLES

The present disclosure will be described below in detail by presenting examples and comparative examples. Note that each of the configurations, combinations thereof, and the like in each example are merely an example, and various additions, omissions, substitutions, and other changes may be made as appropriate without departing from the spirit of the present disclosure. The present disclosure is not limited by the examples and is limited only by the claims.

First Example (Preparation of Cellulose Solution)

In a flask, sodium hydroxide was dissolved in water, the solution was cooled to room temperature, and powdered cellulose (ASAHI KASEI CORPORATION, CEOLUS PH 101, degree of polymerization: approximately 200) was dispersed therein with stirring. Furthermore, after urea was added and dissolved, the mixture was cooled to −15° C. with stirring for approximately 1 hour, and then heated to room temperature using a water bath, resulting in a generally clear solution. The added amount of each reagent was weighed and added in the state of the cellulose solution such that the sodium hydroxide was 7 mass %, the powdered cellulose was 4 mass %, and the urea was 12 mass %.

(Atomization)

The obtained cellulose solution (temperature 25° C.) was sprayed from above to below in a vertical direction in a mist form together with nitrogen gas from a three-fluid nozzle (the particle size of the sprayed cellulose solution was approximately 10 to 200 µm), and dropped into liquid methanol (temperature 25° C.) which is a coagulation phase. The space to be sprayed is a closed space (filled with nitrogen gas at a temperature of 25° C.) other than an exhaust port for releasing nitrogen gas provided from the nozzle, and liquid methanol is installed below the three-fluid nozzle. The exhaust port was provided with a filter so that the sprayed cellulose did not leak from the spray space and was designed so that the spray space was not actively negative as compared to the outside. After spraying, the fine powder obtained in liquid methanol was recovered. This fine powder was passed through a sieve with aperture openings of 250 µm and washed with water repeatedly on a sieve with an aperture opening of 10 µm to obtain a porous cellulose medium (particle size: from 10 to 250 µm).

Second Example

A porous cellulose medium (particle size: from 10 to 250 µm) was prepared using the same procedure as in Example 1 except that the powdered cellulose in Example 1 was changed to regenerated cellulose and the cellulose concentration at the time of the cellulose solution was set to 3 mass %.

Third Example

A porous cellulose medium (particle size: from 10 to 250 µm) was prepared using the same procedure as in Example 1 except that the powdered cellulose in Example 1 was changed to KC FLOCK W-200 (degree of polymerization approximately 250), Nippon Paper Industries Co., Ltd., and the cellulose concentration at the time of the cellulose solution was set to 3 mass %.

Fourth Example

A porous cellulose medium (particle size: from 10 to 250 µm) was prepared using the same procedure as in Example 1 except that the spray nozzle of Example 1 was changed to a two-fluid nozzle.

Fifth Example

A porous cellulose medium (particle size: from 10 to 250 µm) was prepared using the same procedure as in Example 1 except that the spray nozzle of Example 1 was changed to a two-fluid nozzle which is different from that of Example 4.

Example 6

A porous cellulose medium (particle size: from 10 to 250 µm) was prepared using the same procedure as in Example 4 except that the composition of liquid methanol installed below the nozzle in Example 4 was a mixed solution of equal amounts of water and methanol.

Example 7

A porous cellulose medium (particle size: from 10 to 250 μm) was prepared using the same procedure as in Example 4 except that sodium hydroxide in Example 4 was changed to lithium hydroxide, the lithium hydroxide concentration at the time of the cellulose solution was changed to 8 mass %, and the urea concentration was set to 15 mass %.

Comparative Reference Example 1

Figure 5:
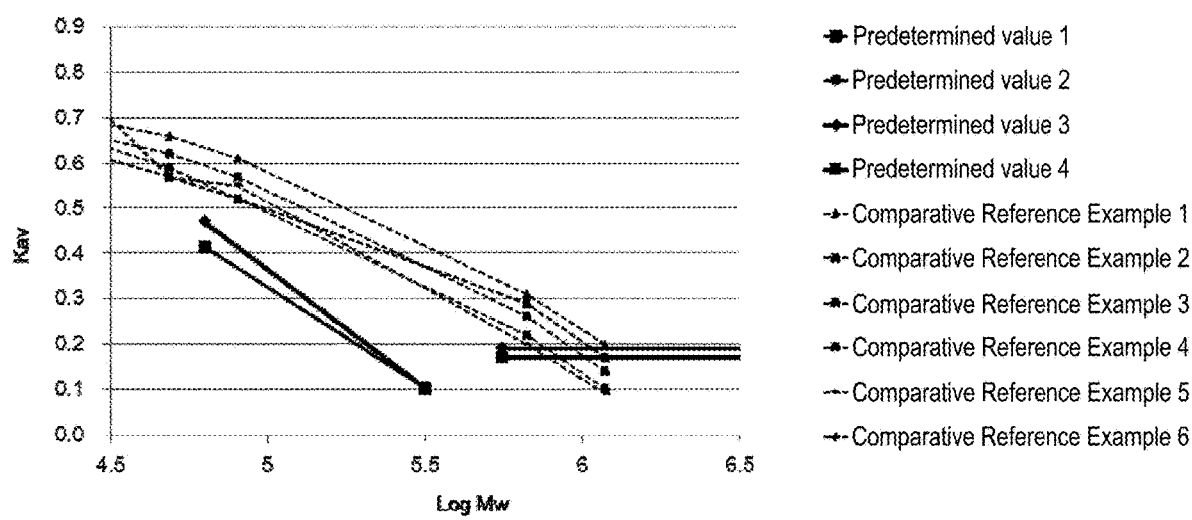
FIG. 5 is a graph showing a relationship between a logarithm of the weight average molecular weight (log Mw) and the gel partition coefficient $K_{av}$ of the polyethylene oxide standard with regard to the porous cellulose media of Comparative Reference Examples 1 to 6. A straight line with a predetermined value of 1 to 4 is also illustrated.

The numerical values were obtained from the results (graph) shown for Example 2 of Patent Document 1, and the values of gel partition coefficients $K_{av}$ and log Mw were plotted to create a graph of FIG. 5.

Comparative Reference Example 2

The numerical values were obtained from the results (graph) shown for Example 3 of Patent Document 1, and the values of gel partition coefficients $K_{av}$ and log Mw were plotted to create a graph of FIG. 5.

Comparative Reference Example 3

The numerical values were obtained from the results (graph) shown for Example 4 of Patent Document 1, and the values of gel partition coefficients $K_{av}$ and log Mw were plotted to create a graph of FIG. 5.

Comparative Reference Example 4

The numerical values were obtained from the results (graph) shown for Example 5 of Patent Document 1, and the values of gel partition coefficients $K_{av}$ and log Mw were plotted to create a graph of FIG. 5.

Comparative Reference Example 5

The numerical values were obtained from the results (graph) shown for Example 7 of Patent Document 1, and the values of gel partition coefficients $K_{av}$ and log Mw were plotted to create a graph of FIG. 5.

Comparative Reference Example 6

The numerical values were obtained from the results (graph) shown for Example 8 of Patent Document 1, and the values of gel partition coefficients $K_{av}$ and log Mw were plotted to create a graph of FIG. 5.

Comparative Reference Example 7

Figure 6:
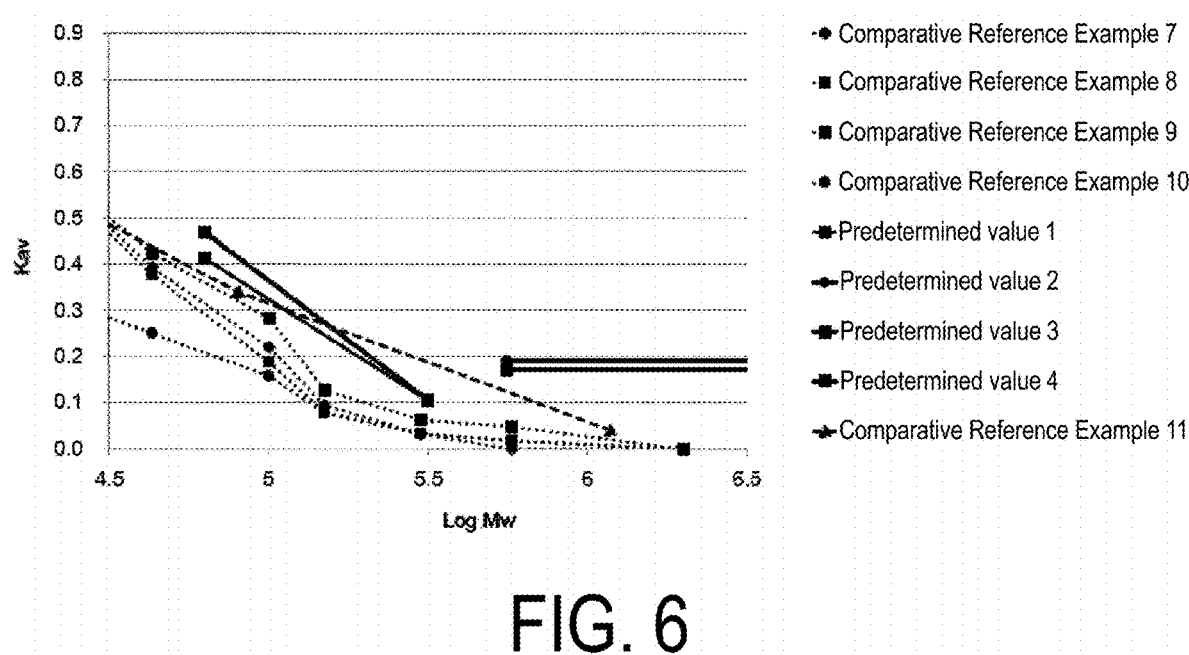
FIG. 6 is a graph showing a relationship between a logarithm of the weight average molecular weight (log Mw) and the gel partition coefficient $K_{av}$ of the polyethylene oxide standard with regard to the porous cellulose media of Comparative Reference Examples 7 to 11. A straight line with a predetermined value of 1 to 4 is also illustrated.

The numerical values were obtained from the results (graph) shown for Comparative Reference Example 1 of Patent Document 2, and the values of gel partition coefficients $K_{av}$ and log Mw were plotted to create a graph of FIG. 6.

Comparative Reference Example 8

The numerical values were obtained from the results (graph) shown for Example 4 of Patent Document 2, and the values of gel partition coefficients $K_{av}$ and log Mw were plotted to create a graph of FIG. 6.

Comparative Reference Example 9

The numerical values were obtained from the results (graph) shown for Example 1 of Patent Document 2, and the values of gel partition coefficients $K_{av}$ and log Mw were plotted to create a graph of FIG. 6.

Comparative Reference Example 10

The numerical values were obtained from the results (graph) shown for Example 2 of Patent Document 2, and the values of gel partition coefficients $K_{av}$ and log Mw were plotted to create a graph of FIG. 6.

Comparative Reference Example 11

The numerical values were obtained from the results (graph) shown for Comparative Reference Example 2 of Patent Document 1, and the values of gel 30 partition coefficients $K_{av}$ and log Mw were plotted to create a graph of FIG. 6.

Measuring Gel Partition Coefficient $K_{av}$ and Calculating Relationship with Log Mw The porous cellulose media obtained in the examples were sieved for classification, and using a fraction corresponding to aperture openings between 53 μm and 106 μm as a support for size exclusion chromatography, a polyethylene oxide standard was run through size exclusion chromatography with pure water as a mobile phase, and thus the gel partition coefficient $K_{av}$ was obtained. Specifically, the classified porous cellulose medium was packed in a column ("Tricorn 10/100" manufactured by GE Healthcare Japan) so that the bed height was 8 cm or greater. The column was connected to high speed liquid chromatography system to perform size exclusion chromatography measurements. The marker was used by dissolving polyethylene oxide (TSKgel polyethylene oxide standard se kit manufactured by TOSOH) and dextran (Blue Dextran 2000, available from Ge Healthcare) was dissolved in ultrapure water and used. While degassed ultrapure water was flowing through the column at a flow rate of 0.1 mL/min, first, in order to determine the volume other than a bead portion in the column, a solution of dextran (Blue dextran (Blue Dextran 2000 available from GE Healthcare)) having a weight average molecular weight of $2 \times 10^6$ was injected, and a liquid flow rate until the peak was observed after the injection on a RI monitor. Next, the liquid flow rate was obtained similarly for each marker solution. The measured value was substituted into the following equation to calculate the value of $K_{av}$.

$$K_{av} = (V_R - V_0)/(V_t - V_0)$$

[where $V_R$ represents the amount of liquid flow rate (mL) until the peak is observed after injecting each of the marker solutions, $V_0$ represents the liquid flow rate (mL) until the peak is observed after injecting the dextran solution having a weight average molecular weight of $2 \times 10^6$, and $V_t$ represents a volume (mL) of beads in the column.]

The results are shown in FIGS. 1 to 4 together with the straight line of the predetermined value 1 to 7 shown below. Note that, regarding Comparative Reference Examples 1 to 11, the numerical values were obtained from Patent Documents 1 and 2, and the relationship between the gel partition coefficient $K_{av}$ and log Mw is illustrated in FIGS. 5 and 6.

Straight line with predetermined value 1: in a case where $4.80 \leq \log Mw \leq 5.50$, $K_{av} = -0.445 \times \log Mw + 2.55$ Straight line with predetermined value 2: in a case where $5.75 \leq \log Mw$, $K_{av} = 0.19$ Straight line with predetermined value 3: in a case where $4.80 \leq \log Mw \leq 5.50$, $K_{av} = -0.521 \times \log Mw + 2.97$ Straight line with predetermined value 4: in a case where $5.75 \log Mw$, $K_{av} = 0.17$ Straight line with predetermined value 5: in a case where $4.80 \leq \log Mw \leq 5.50$, $K_{av} = -0.445 \times \log Mw + 3$ Straight line with predetermined value 6: in a case where $5.75 \leq \log Mw$, $K_{av} = -0.0482 \times \log Mw + 0.3$ Straight line with predetermined value 7: in a case where $4.80 \leq \log Mw \leq 5.50$, $K_{av} = -0.521 \times \log Mw + 3.2$

The invention claimed is:

1. A porous cellulose medium comprising a porous cellulose particle having a particle size from 1 to 600 µm, wherein, in sieving the porous cellulose medium for classification and using a fraction corresponding to aperture openings between 53 µm and 106 µm as a support for size exclusion chromatography, a polyethylene oxide standard is run through size exclusion chromatography with pure water as a mobile phase, and a weight average molecular weight Mw and a gel partition coefficient $K_{av}$ of the polyethylene oxide standard satisfy Relationships (A) and (B):

in a case where $4.80 \leq \log Mw \leq 5.50, K_{av} > -0.445 \times \log Mw + 2.55$ (A)

in a case where $5.75 \leq \log Mw, 0 \leq K_{av} < 0.19$ (B).

2. The porous cellulose medium according to claim 1, wherein the weight average molecular weight Mw and the gel partition coefficient $K_{av}$ of the polyethylene oxide standard satisfy Relationship (C):

in a case where $4.80 \leq \log Mw \leq 5.50, -0.445 \times \log Mw + 3 > K_{av} > -0.445 \times \log Mw + 2.55$ (C).

3. A method for producing a porous cellulose medium, comprising:

atomizing a cellulose solution by spraying into a space from a spray nozzle, so as to form a fine particle; and coagulating the fine particle in a coagulation phase, wherein in atomizing the cellulose solution, the space where the cellulose solution is sprayed is controlled such that a gas to be supplied is only a gas being supplied together with the cellulose solution from the spray nozzle, wherein the porous cellulose medium comprises a porous cellulose particle having a particle size from 1 to 600 µm, and wherein, in sieving the porous cellulose medium for classification and using a fraction corresponding to aperture openings between 53 µm and 106 µm as a support for size exclusion chromatography, a polyethylene oxide standard is run through size exclusion chromatography with pure water as a mobile phase, and a weight average molecular weight Mw and a gel partition coefficient Kav of the polyethylene oxide standard satisfy Relationships (A) and (B):

in a case where $4.80 \leq \log Mw \leq 5.50, Kav > -0.445 \times \log Mw + 2.55$ (A)

in a case where $5.75 \leq \log Mw, 0 \leq Kav < 0.19$ (B).

* * * * *